United States Patent [19]

Jarret et al.

[11] 4,154,200
[45] May 15, 1979

[54] NON-POLLUTING HEAT MACHINE WITH INTERNAL COMBUSTION

[76] Inventors: Jacques H. Jarret, 11, rue des Chenes, Le Vesinet, Yvelines; Jean M. B. Jarret, La Champanelle, Chemin au Clos Baron, Fourqueux, Yvelines, both of France

[21] Appl. No.: 709,190

[22] Filed: Jul. 27, 1976

Related U.S. Application Data

[63] Continuation of Ser. No. 447,837, Mar. 4, 1974, abandoned, which is a continuation-in-part of Ser. No. 240,534, Apr. 3, 1972, abandoned.

[30] Foreign Application Priority Data

Apr. 9, 1971 [FR] France .................................. 71.12809

[51] Int. Cl.$^2$ .............................................. F02B 71/00
[52] U.S. Cl. .................................. 123/46 R; 123/46 E; 290/1 R
[58] Field of Search .......................... 123/46 E, 46 R; 290/1 R

[56] References Cited

U.S. PATENT DOCUMENTS

| 3,112,060 | 11/1963 | Ollier et al. | 123/46 R |
| 3,119,230 | 1/1964 | Kosoff | 123/46 R |
| 3,234,395 | 2/1966 | Colgate | 123/46 E |
| 3,297,007 | 1/1967 | Monpetit | 123/46 R |

Primary Examiner—Wendell E. Burns
Attorney, Agent, or Firm—Walter Becker

[57] ABSTRACT

The machine comprises one cylinder in which two symmetrical opposed working pistons are placed. A gas-oil introduced between the pistons burns and causes a reciprocating motion of the working pistons against the return motion of two resilient devices. An energy is produced thereby and is extracted without mechanical connections. The mass of the working pistons ranges between 5 and 30 grams per cm$^3$ of the cylinder. The quantity of gas-oil ranges between 0.01 and 0.02 milligram per cm$^3$ of the cylinder. The resilient devices are effective for accumulating and sending back upon each reciprocating motion thereof a power ranging between 0.5 and 2 joules per cm$^3$ of the cylinder.

6 Claims, 5 Drawing Figures

NON-POLLUTING HEAT MACHINE WITH INTERNAL COMBUSTION

This is a continuation of application Ser. No. 447,837, now abandoned filed Mar. 4, 1974, which is a continuation in part of Ser. No. 240,534, now abandoned filed Apr. 3, 1972.

It is well-known that in heat engines with internal combustion apparatus having cylindrical pistons, upon every cycle there is consumed a quantity of fuel corresponding to an important portion of the oxygen from the air compressed into the cylinder, the gas temperatures in general reaching values higher than 2,000° Kelvin.

Of course, it would be preferable to reduce the richness in hydrocarbon (ratio between the quantity of oxygen of the air capable of participating to the combustion and the quantity of oxygen which would be consumed by a complete combustion of the fuel introduced into the cylinder). The foregoing usually varies, at maximum load of the engine, from 0.4 for a diesal with a high air excess, to 1.2 for an engine with ignition and carburetor. Actually, the high richness of the mixture tends to send into the atmosphere three poisonous products:

1° the unburnt products resulting from the not complete combustion of hydrocarbons,
2° carbon monoxide resulting from a combustion in presence of an insufficient quantity of oxygen,
3° nitrogen oxides mainly resulting from the high temperature values and duration.

But if the richness is substantially reduced, it is necessary to increase the rotation speed to maintain the mass or power of the machine. The foregoing causes a high increase of the mechanical losses and reduces the working output in a proportion generally not acceptable.

To realize engine operation with internal combustion which is non-polluting and which has a high working output, the following conditions should be simultaneously complied with (a) reduce the richness in combustible, (b) make the ratio "mechanical losses/power" low and independent of the frequency, (c) decrease the maximal temperature and the time duration of high temperatures.

The object of this invention is to solve the above mentioned problem, by using a machine with internal combustion comprising at least one cylinder with intake and exhaust apertures and relative to which two symmetrical working parts move. These parts form opposite pistons adapted to compress the mixture introduced into the cylinder under the return impulse of two resilient devices.

According to the invention, the non-polluting heat machine with internal combustion comprises at least one cylinder with intake and exhaust apertures and having two symmetrical working parts movable therein constituting opposite pistons provided to compress under the return impulse of two resilient devices a combustible fuel mixture introduced into the cylinder. In order to produce an effective energy under the action of the burnt gas and through a reciprocating motion of said working parts, the present invention is characterized by the fact that the energy is extracted without the presence of any positive driving elements connected to the piston. The pistons have a mass ranging between 5 and 30 grams per $cm^3$ of the cylinder volume computed at its maximal value when the mobile working parts obturate the intake and exhaust apertures. The quantity of fuel injected upon every cycle at maximum power is in a range between 0.01 and 0.02 milligrams of gas-oil or the equivalent quantity in heat energy of another fuel, per $cm^3$ of said maximal volume. The return resilient devices for the working parts are provided to accumulate and send back upon every cycle a mechanical energy in a range between 0.5 and 2 joules per $cm^3$ of said maximal volume.

Other characteristics of the invention are shown in the following detailed description.

Figure 1:
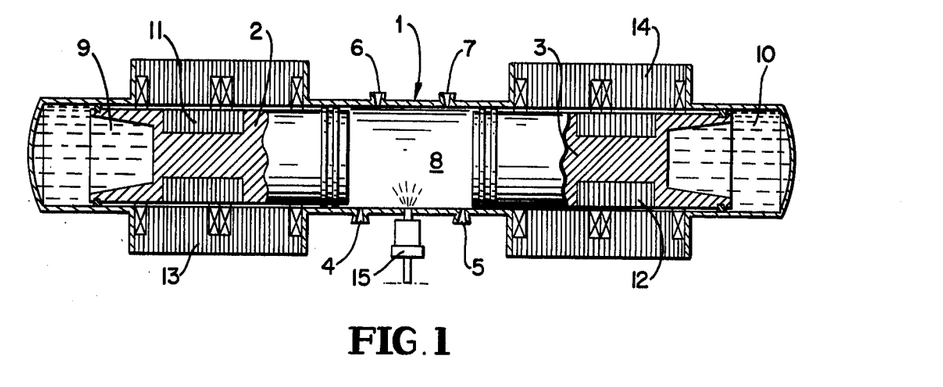
FIG. 1 is a longitudinal sectional view of the machine according to the invention.

The figure is a sectional view of the machine according to the invention.

On the drawing, the machine comprises only one heat cylinder 1, in which two cylindrical working parts 2 and 3 move. The heat cylinder 1 is provided with intake apertures 4 and 5 and exhaust apertures 6 and 7. The working parts 2 and 3 are symmetrically swiveling. This occurs on one hand between an internal dead point reached when the working facing sides of the opposite pistons are stopping at 0.2 om from each other this results after having compressed the combustible mixture introduced into the median chamber 8 and having a variable volume defined between said piston. On the other hand, an external dead point is reached when the opposite sides of the pistons have compressed the liquid of two return resilient hydraulic devices 9 and 10. Each piston also comprises a lamellar ring-like mass 11 or 12 designed to be moved during the reciprocating motion of each piston in front of a corresponding ring-like inductor 13 or 14.

The inductors 13 and 14 as well as the lamellar masses 11 and 12 constitute as a whole starting components for operating the machine, timing components for the motion in phase of the pistons and the sources of production and extraction of the electrical power produced by the operation of the machine.

Figure 3A:
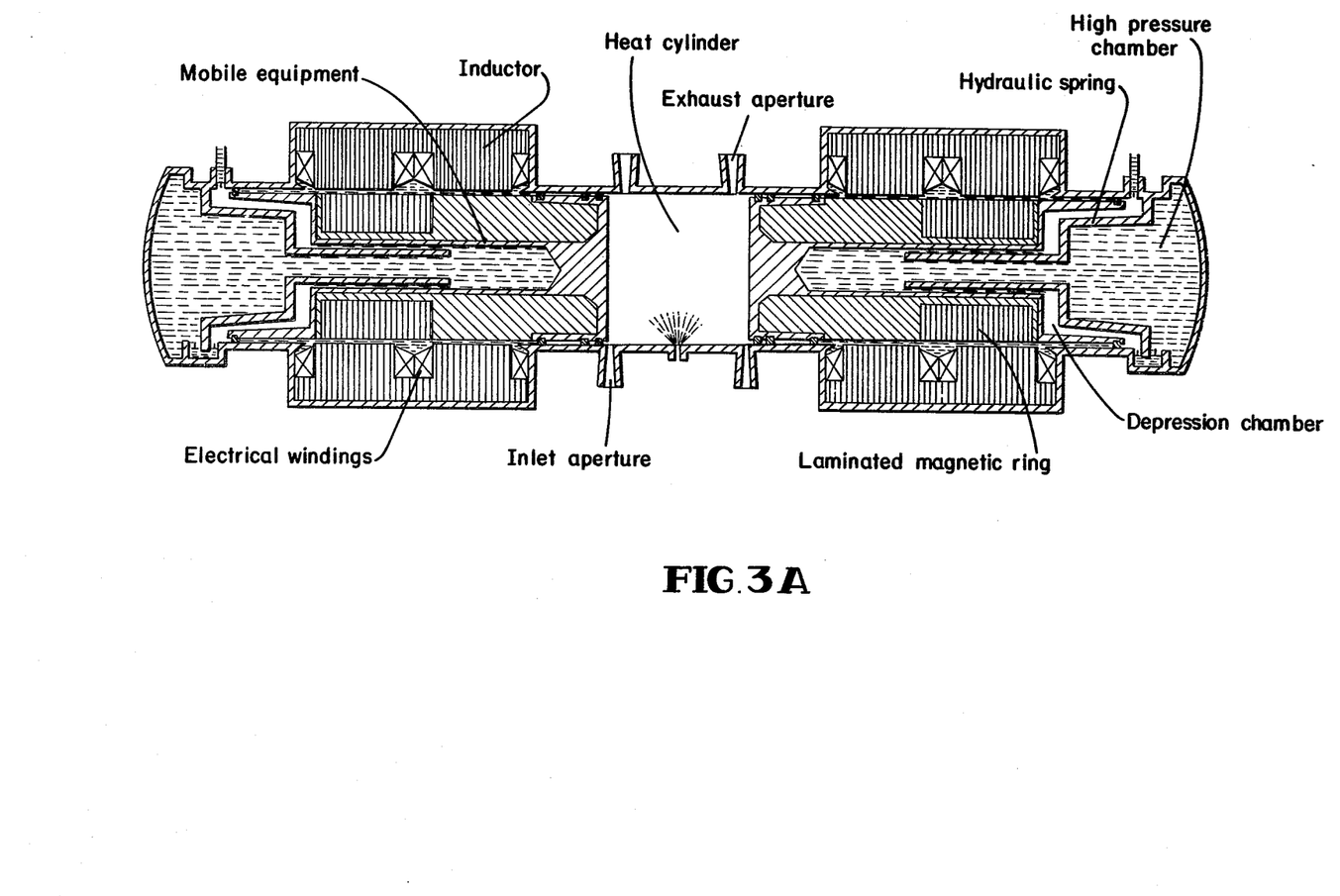
FIG. 3A is a longitudinal sectional view of another embodiment in which external connections are provided for access to the liquid of the hydraulic cushioning means for the pistons, as for power take-off through the pressure of the liquid, the parts being labeled for identification by inspection of the drawings.
Figure 4:
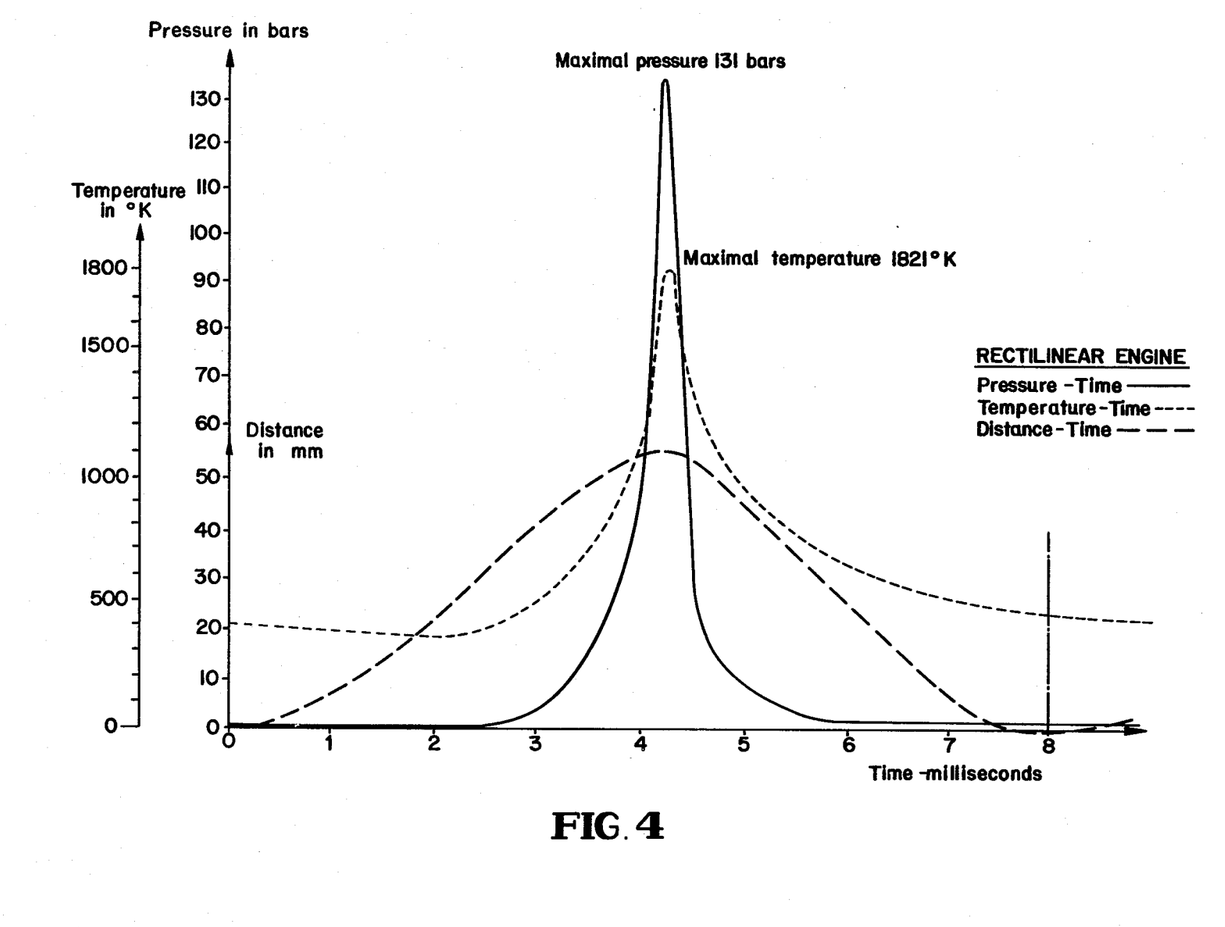
FIG. 4 shows curves representing further combustion characteristics of the machine, the curves being labeled with the several characteristics.

Of course, the machine could produce another sort of power, for example an hydraulic power taken from the hydraulic devices 9 and 10 which will then comprise inlet and outlet means for the fluid (see FIG. 3A), or also a pneumatic power produced in a similar way.

As above mentioned, one of the conditions that permits attaining of a non-polluting heat machine consists of reducing the richness of the fuel to a value much lower than the one which would require the utilization of an important proportion of oxygen. According to the invention, to comply with said condition, the weight of the fuel injected upon every cycle, under the circumstances an hydrocarbon of the gas-oil type, is limited to a value lower or equal to 1/50 of the weight of the air compressed into the chamber 8.

To comply with the second condition and make the ratio mechanical losses/power low and independent of the motion frequency, any positive driving system, as for example connecting-rods, is avoided. Furthermore, the produced power is directly extracted as above described according to the type of power which is produced.

To comply with the third condition, the quantity of power given to the compressed gas through the working parts by the devices 9 and 10 is limited and the mass of said working parts is reduced. The foregoing enables increase in the motion frequency to a value for example higher than 50 cycles per second and consequently permits reduction in the time duration of the high temperatures of combustion.

According to the invention, after closing the aperture 4–5 and 6–7, the chamber 8 has a maximal volume of 200 cm³. The quantity of fuel introduced by an injector 15 is in a range between 0.01 and 0.02 milligram of gas-oil (or the equivalent quantity in heat energy of another fuel) by cm³ of the maximal volume; in the present example, the quantity of fuel is determined as being of 0.015 milligram per cm³ that is 3 milligrams. If it is assumed that the weight of air contained in the cylinder is 0.2 gram, then the ratio "fuel/air" is 1/67, which corresponds to a considerable air excess and to a richness of about 0.22.

In such a machine, if the injection is finished before attaining the internal dead point and if the atomization of the fuel is adequate, the combustion must be complete with practically no unburnt products.

Due to the considerable air excess, the formation of carbonmonoxide can be almost entirely avoided if the atomization of the fuel in the cylinder, through the injection and through the movement of the gas under high pressure, is satisfactory and provides obtaining a homogeneous mixture.

According to another embodiment of the invention, the return resilient hydraulic devices are designed to accumulate and send back a total power in a range between 0.5 and 2 joules per cm³. This represents under the present circumstances 1 joule per cm³ that in 200 cm³ of gas oil compressed upon every cycle at a pressure of 426 bars. The compressibility of the gas-oil is approximately 0.00005 per bar so that the power accumulated in each device is equal to:

$$\frac{0.000\,055 \times 426^2 \times 200}{20} = 100 \text{ joules}$$

On the other hand, the working parts are given a mass comprised between 5 and 30 grams per cm³ of the maximal volume of 10 grams per cm³, that is equal to 2 kilograms in entirety for the working parts. Each working part having a mass of 1 kilogram can be sent back by the corresponding resilient devices 9 or 10 at a maximal theoretical speed of $$\frac{\sqrt{2 \times 100}}{1} = 14,4 \text{ m/s,}$$

which corresponds to an average speed of about 10 m/s. The operating frequency of the machine is then approximately at a value of 100 cycles per second. The duration of every cycle is 10 milliseconds and the time duration of the high temperatures, higher than 1 200° kelvin, is about 1 millisecond.

The maximal temperature can only result from an overheating of the gas caused partly by the combustion of the fuel injected and partly by about 80% of the mechanical energy sent back by the return resilient hydraulic devices. If, in the present example, there is assumed a heating power of 10 calories for 1 milligram of fuel and an average specific heat of 0.25, then the overheating of the gas is approximately equal to:

$$\frac{(10 \times 3) + (\frac{200}{4.18} \times 0.8)}{0.2 \times 0.25} = 1\,360° \text{ Kelvin}$$

If, upon the closing of the apertures, the gas temperature is in the range of 305° Kelvin, the maximal temperature reaches $1\,360° + 350° = 1\,710°$ Kelvin.

For such a maximal temperature and a high temperature time duration of 1 millisecond, the formation of nitrogen oxide is extremely small.

The machine, then, does not practically send out poisonous gas and yet the working output of said machine is high due to the fact, on one hand of the high volumetric ratio equal to 1/26 and to the low heat losses through the walls and, on the other hand, due to the low mechanical losses resulting from the absence of positive driving arrangement. Besides, the power is still important, being about 8 CV for 200 cm³ of efficient cubic capacity, in spite of the low richness, considering the high frequency and the good working output.

It is known that heat engines with internal combustion and with pistons send exhaust gases into the atmosphere; these gases contain polluting ingredients essentially including the following:

(1) Unburned ingredients including various hydrocarbons and carbon-soot.
(2) carbon monoxide,
(3) nitrogen oxides.

The fundamental chemical reactions allowing the heat energy in conditions ensuring the transformation of said energy into mechanical energy, can occur without emission of these polluting ingredients. The only gases for which formation cannot be avoided are the water vapor and carbonic gas.

Attempts have been made to determine the physical conditions which would allow a non-polluting combustion, since it is obvious and well-known that the operating conditions of the present piston engines cause the emission of one or various polluting ingredients.

From the studies and experiments carried out, it appears that for an internal combustion engine with pistons, these physical conditions can practically be summed up as follows:

1 Value of the mixture hydrocarbon-air: 0.25 ($\pm 20\%$)
2 Volumetrical ratio: 26 ($\pm 10\%$)
3 Maximal temperature during the combustion: $1\,900°$ K. ($\pm 10\%$)
4 Duration of the temperatures higher than 1 200° K.: 500 microseconds (300 to 1000 sec).

There being understood that the mixture of air-hydrocarbon can be suitably realized (good homogeneity, very thin drops, injection at the start of the compression) and that the temperatures of the walls (side of pistons and central ring of the cylinder) are to be sufficient, then there appears that:

(1) the combustion is very complete due to the high volumetric ratio and to the small value of the mixture, to avoid emission of unburned ingredients, including hydrocarbons, carbon-soot and the like.

(2) the carbon monoxide is eliminated due to the air being in excess (the mixture contains about four times more oxygen than is required for the combustion).

(3) the nitrogen oxides can be formed only in a negligible quantity due to the low level and the short duration of the high temperatures (the proportion of the nitrogen oxides would be about 1/1,000,000).

An engine which meets such combustion conditions causes very little pollution but there is to be noticed that if there is simultaneously imposed a volumetric ratio of 26 and a duration of the high temperatures (higher than 1,200° K.) of 500 microseconds, then the maximal pressure and the pressure gradient is such that no crosshead-crank unit could suitably work.

Consequently, it is necessary to ensure the operation of the pistons and the transfer of the requested energy by hydraulic and electro-magnetic means. For example it is possible to provide a cylinder wherein symmetrically two pistons move oppositely (as with generators having loose or free pistons) without any crosshead and without any mechanical connection between pistons.

In fact, it is known that a liquid compression spring can ensure the reversing of mobile equipment at high frequencies (about 100 cycles per second) with an excellent output. On the other hand, with electro-magnetic devices with a variable reluctance the start of the engine can be ensured includes also the synchronism of the mobile equipment and the transfer of the energy in the electrical form.

But, with respect to the physical conditions which avoid the formation of polluting ingredients, there must be established in such an engine with opposite pistons connections between the following:

(1) the mass of the compressed mixture air-hydrocarbon,
(2) the energy accumulated into the reversing hydraulic spring,
(3) the mass and the stroke of the mobile equipments,
(4) the quantity of hydrocarbon injected at each cycle.

In fact, with no pre-compression, if the efficient cylinder charge (volume between opposite pistons at the turning off of the lights) is indicated, the means of the mixture is determined and consequently the quantity of combustible material is determined to obtain the requested value of 0.25.

On the other hand, to obtain the compression volumetric ratio of 26 the reversing springs have to accumulate and reverse a determined quantity of mechanical energy.

The mass of the mobile equipment is also determined in relation with the efficient cylinder charge because said mass principally is the result of the ferro-magnetic rings on which the inductors work. The mass of ferro-magnetic material is directly proportional to the quantity of energy transferred to each cycle.

Then, to obtain the operating frequency which allows the limitation of the high temperature duration, the stroke of the mobile equipment will be determined in accordance with the mass thereof, taking into consideration of the resilient characteristics of the air mass contained in the cylinder, and also taking into consideration the characteristics of the reversing springs.

Thus, considering an efficient cylinder charge to be 1 cubic decimeter, then the compressed air mass is about 1 gram. The mass of combustible burned during each cycle is 0.016 gram (value of 0.25 taking into consideration the presence of burned gas in the compressed air).

To compress the air mass of 1 gram with a volumetric ratio of 26, there is taken into consideration the energy during the stroke of the pistons and also the increase of pressure due to the combustion. The reversing spring has to develop a mechanical energy of about 1,000 joules.

If the combustion material of each gram of combustible develops 40,000 joules and if the output of the machine is 0.5 (not taking into consideration the transformation into electrical energy), the quantity of useful energy at each cycle on the ferro-magnetic rings of the mobile equipment is $40,000 \times 0.016 \times 0.5 = 320$ joules.

Consequently, under normal conditions of utilization of a rectilinear alternator, the mass of saturated iron which allows transfer of a quantity of energy of 1 joule is 20 grams. The mass of ferro-magnetic material of the mobile equipment is thus $20 \times 320 = 6400$ grams and the mass of the mobile equipment (approximately 50% higher) is about 10 kilos.

If it is admitted that the maximal kinetic energy of said mobile equipment corresponds to the 1,000 joules required for the compression (which is sufficiently close to the true needs) the maximal speed of the equipment reaches the following:

$$V = \frac{2 \times 1000}{10}$$

which means about 14 m/sec. The average speed is then located between 10 and 13 meters/second (depending on the characerics of the springs).

To comply with the short duration of the high temperatures, it is necessary that the motion frequency of the mobile equipment should be 100 cycles/second, which corresponds to an approximate stroke of 50 to 65 mm.

It is noticeable that for realizing the physical conditions which allow a non-polluting combustion, it is necessary to have simultaneously, for each unit of the cylinder a charge volume, a given mass of mobile equipment, a determined quantity of burned combustible and a determined energy which must be stored and sent back into the reversing springs.

If too considerable a distance or divergence from these values is taken, it is no longer possible with a suitable output to provide the useful energy without producing the usual pollution: either the temperature becomes too high or the duration of the high temperatures becomes too important, or the compression is not sufficient to ensure the combustion of a weak mixture.

The present disclosure defines the above relations constituting the original characteristics of the engines with non-polluting internal combustion (called rectilinear engines).

In summary, the features of the present invention create a non-polluting engine which has thereby taken into consideration a very particular shape and which makes use of very precisely defined elements to obtain a good output from the structure of the engine itself.

In order to understand how the engine is charged with air, there is noted that the charge of the engine with air is obtained by using the energy contained in the exhaust gases. The expansion of the burnt gases propels the gaseous column of the outlet pipe and, upon causing a depression in the cylinder, ensures the filling with fresh air from the inlet pipe.

For this purpose, the heat cylinder comprises outlet and inlet apertures placed on each side of said cylinder. The opposite pistons, during the expansion of the gases after combustion, first uncover the outlet apertures through which a portion of the burnt gases is ejected, under the action of the residual pressure. The kinetic energy of this gaseous mass having a fast motion is partly communicated to the gases in the exhaust pipe and which are moving towards the outside atmosphere. At that moment the pistons uncover the inlet apertures and the gaseous column of the exhaust pipe drives thereafter a portion of the burnt gases still contained in the cylinder and a certain mass of fresh air which penetrates in turn into said cylinder.

After the passage of the pistons to the outer dead point, the pistons are urged or sent back by the hydraulic springs and thereby successively obturate the inlet and outlet apertures. At the start of the compression step there is enclosed in the cylinder a mixture of fresh air and of burnt gases. Because of the low quantity of fuel (richness value limited to 0.25) injected during the previous cycle, these burnt gases still contain the $\frac{3}{4}$ of their oxygen and it is only necessary to replace the oxygen effectively used for the combustion (as accomplished by an addition of fresh air). This result is obtained when the quantity of fresh air, which crosses, at each cycle, the inlet apertures, represents in volume about 40% of the efficient cubic capacity (volume comprised between the opposite piston sides at the closing of the outlet apertures).

This method for a charge with air is only usable when the machine works at a substantially invariable frequency, the sizes of the pipes being determined in such a way that the transfer of the gases be ensured by resonance phenomena whose incitement is provided by the opening of the apertures.

Figure 1A:
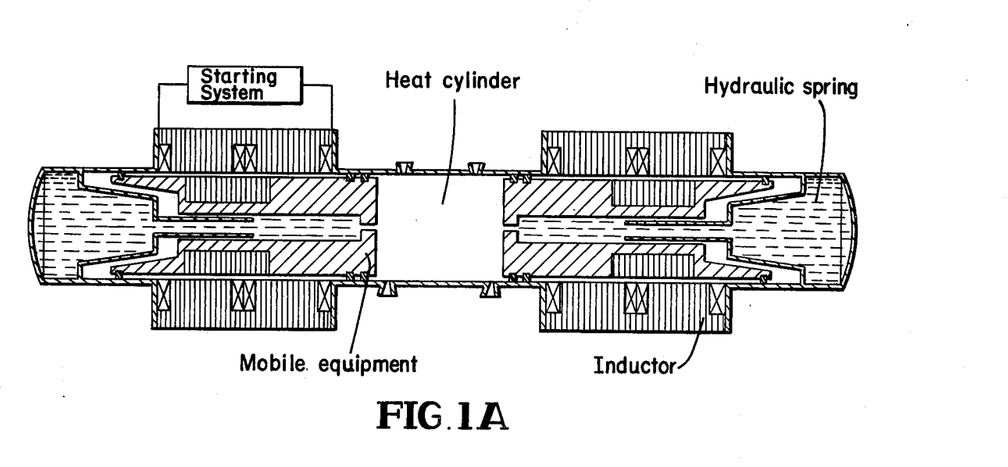
FIG. 1A is a longitudinal sectional view of a modification of the machine of FIG. 1, with a diagrammatic showing of a starting system, the parts being labeled for identification by inspection of the drawings.

In order to facilitate understanding how the engine is started, as indicated by the Starting System in FIG. 1A, there can be considered the following explanation. To start the engine, it is necessary to make the mobile parts oscillate symmetrically, at a frequency and at an amplitude which progressively are close (within about 10 or 20%) to that of normal operation. For that purpose there are utilized the magnetic circuits of the two rectilinear alternators which are then fed as an engine from a battery.

It is known that the rectilinear alternators comprise two sets of coils: an inner set close to the heat cylinder and an outer set close to the hydraulic springs. When it is desired to start the engine, with the help of an appropriate electronic control device, there are supplied from the battery, electrical pulses which are synchronized with the motion of the pistons, sometimes in the inner set of coils, sometimes in the outer set. The passage of the current in the coils causes magnetic fields which operate, in one direction and then in another direction, relative to the magnetic rings of the mobile parts.

Upon each half-cycle, the mobile parts are resiliently returned sometimes by the air compressed in the cylinder, sometimes by the liquid compressed in the hydraulic spring. At each electro-magnetic pulse the mobile parts are accelerated, the frequency and the amplitude increasing up to the point that the losses (rubbing over, heating of the gases, leaks, etc . . .) correspond to the electrical power supplied to the machine. This balance is reached in a fraction of second (for example in 20 cycles and 0.4 second) and, if the electrical power supplied for the start is equal to the quarter or to the third of the nominal power of the machine, the frequency reaches 80 to 85% of the nominal frequency with an amplitude equal to about 90% of the maximal stroke.

Within the cylinder, and at each cycle, the pressure then increases to a value between 30 and 50 bars, the temperature being higher than 1000° K. The control for the supply with fuel is automatically operated at that moment, and the air-fuel mixture burns from the moment of the first injection. This supply of energy increases the frequency and the amplitude; the starting electrical pulses are stopped; the regulation device operates to limit the speed of the mobile parts, and the rectilinear alternators return to their normal operation.

The starting power, supplied by the battery is relatively important. But the starting step being on a very short period, the required energy remains very low.

During the entire starting step, the synchronism of the motion of the two mobile parts is ensured by the coupling of the two symmetrical electromagnetic devices which are, together and successively, engines and alternators.

In order to facilitate understanding how, once started, the electrical energy is generated, there is to be noted that the symmetrical rectilinear alternators are machines with variable reluctance characterized by the systematic utilization of the saturation of the mobile parts.

Each alternator comprises a steady inductor fixed to the frame of the machine and a mobile magnetic ring placed at the rear portion of the heat piston.

The inductor comprises two crowns of contact-studs provided with coils, a crown of contact-studs to the heat cylinder and a crown close to the hydraulic spring. The contact-studs are composed of sheets of iron with silicium and are placed in such a way that (when the energizing current is established and whatever the load may be) under the action of the motion of the magnetic ring, the fluxes of the contact-studs of a same crown simultaneously change in the same way, while the fluxes of the other crown simultaneously change but in the opposite way.

In fact, the energizing ampere-turns being always higher than the picking-up ampere-turns, the direction of the flux is invariable in each contact-stud. But said flux changes with the position of the mobile magnetic ring, the sizes of which are such that at any moment the polar surface of the contact-studs covered by the ring remains invariable. When the contact-studs of the other crown are entirely uncovered. The magnetic ring being always saturated under the contact-studs, the change in the ferris flux is independent from the ampere-turns and the symmetry of the flux changes in the two crowns of contact-studs is ensured independently of the load.

In the rectilinear alternator, the mechanical energy supplied by the pistons to the mobile parts is transformed into electric energy delivered to the terminals of the pick-up coils of the inductors. In fact, the changes of flux in the contact-studs generate electromotive forces which enable establishment of a charge current. The product of the current rate times the electromotive force (on resistive load) represent the instantaneous electric power. On the other hand, the ampere-turns corresponding to said load current localize, while composing themselves with the energizing ampere-turns, involve magnetic fields which are relatively high under the contact-studs that the magnetic ring leaves and relatively lower under the contact-studs where the same penetrates said ring. The result is a magneto-mechanical force which is opposed to the motion of the mobile part with the product of this force times the speed of the part representing instantaneous mechanical power picked-up on the mobile part.

With the exception of the yield rate, the energy mechanically picked-up during a cycle on the mobile part is equal to the useful externally provided electrical energy.

It is to be noted that the mass of saturated iron of the magnetic rings should be consistent with the mass of the mobile parts for frequencies of 50 to 150 Hertz with strokes of 50 to 60 millimeters (which would not be possible with electro-dynamic systems or devices which a variable non-saturated reluctance, wherein the moving mass would be far too high).

With respect to considering where energy is generated, there is to be noted that the present engine is a heat machine which transforms the energy released by the combustion of a hydrocarbon with the oxygen from the air, either mainly into electrical energy furnished in the form of an electrical current delivered under a given voltage, or subsidiarily in mechanical energy furnished in the form of a liquid under high pressure. This machine with cylindrical opposite pistons is characterized by obtaining a heat cycle wherein the duration and the degree of the temperatures higher than 1500° K. are limited in view of preventing the formation of nitrogen oxides. The volumetric ratio is sufficiently high to enable the complete and fast combustion of a very poor or weak air-hydrocarbon mixture; this provides a non-polluting engine.

In the heat cylinder, provided with appropriate outlet and inlet apertures at the start of the cycle there is enclosed a mass of air slightly weakened in oxygen by the previous combustions. This mass of air is compressed under action of the pistons of the mobile parts which have been returned by the hydraulic springs; this compression goes on until the totality of the kinetic energy of the mobile parts is absorbed by the compressed gas, the mass and speed of the mobile parts being established for the ratio of compression to be from 25 to 27. During the compression, fuel is injected in drops of sizes such as to permit the combustion to be completed in due time; this fuel injection itself is completed before the inner dead point. As soon as the compression ratio reaches a certain value (between 10 and 20 depending on the operating conditions), a spontaneous firing starts; then the combustion increases and extends to all the portions of the mixture (in spite of the low richness value of 0.25) due to the fact of the very high volumetric ratio.

This combustion releases a calorific energy (about 10,000 calories per gram of fuel) which tends to increase the temperature and the pressure of the gases enclosed in the cylinder between the two opposite pistons. Due to that fact, the pressures exerted on the pistons are higher (with same position being involved during the expansion step rather than during the compression step). The heat energy is thus transformed into a mechanical energy whose value is equal to the product of the difference of the forces (applied to the pistons during the compression and during the expansion) times the motions of the pistons.

The pistons, during their movement, drive the magnetic rings which cause the fluxes in the inductors to vary in spite of the forces due to the magnetic fields which are opposed to the motion of the mobile parts equipment. The energy resulting from the combustion is then transformed into electrical energy supplied to the terminals of the rectilinear alternators.

A portion of the effective energy can be picked up by the return springs (having an hydrostatic compression). By a means of system of valve and conduits, the liquid can be picked up while it is under high pressure (500 bars for example) and utilized to operate a hydraulic motor (jack, for example).

The heat cycle, realized in such a motor, decreases the formation of polluting products since it maintains the degrees of temperature at values which prevent the formation of nitrogen oxides, while the great excess of air and the high ratio of compression are opposed to the presence, in the exhaust gases, of carbon monoxide and of unburnt gases. Besides, the heat yield is very high because of the important volumetric expansion ratio and the low average temperature of the gases.

In considering how the electric energy is used, the following can be noted. The assembly of the machine constitutes a generating unit supplying a single phase alternating electric current with a substantially invariable frequency. By grouping three cylinders it is possible to supply three-phase alternating current. By modifiing the shape of the contact-studs of the inductors, it is possible to obtain electric pulses of different types and, for example, to have naturally sinusoidal voltage and current.

Yet, the most likely important utilization would be the charge of batteries, and, especially, buffer batteries placed between the Jarret's engine and the electric motors which produce the mechanical energy in a form best adapted to the required use.

In fact, the subject heat engine is a machine with a frequency substantially invariable, while, in most of the cases, the mechanical energy must be given with a very variable rotation speed. Thus, on terrestrial or marine vehicles, the subject engine can be constituted by several cylinders having independent or simultaneous operation (each cylinder being strictly balanced, can oscillate by itself) with the power supplied to the battery depending on the number of cylinders, on operation and on the quantity of fuel injected into each cylinder. The battery is fed through diodes or thyristors suitably placed, and an electronic regulation controls the power supplied by the motor when charging said battery. The current required for the operation of the electric motors having an adjustable speed is itself delivered by the battery under a substantially invariable voltage.

Generally, the battery can have a volume and a mass pretty small; the average power of the subject engine can be easily adapted to the average power requested from the vehicle. Of course, this battery is also utilized to start the heat engine, a switching electronic device being used for that purpose.

It must be kept in mind that it is very logical to pickup the energy delivered by an air-hydrocarbon combustion with the help of an alternate system with an invariable frequency, which, upon each cycle, resets the conditions enabling the transformation of said energy with the best yield and the least disadvantage, while it is desirable to propel the vehicles with means ensuring the continuity of the mechanical strength at variable and adjustable speeds. The improvements in the techniques and especially electronic devices provide now realization and regulation of engine-propeller unit (for) vehicles called "hybrid") far much more efficient and far less polluting than standard machines. The subject engine is a normal part in improvement towards a more rational utilization of the energy supplied in the form of liquid hydrocarbons.

Concerning matters as to how fuel is injected or controlled, there is noted that the supply with fuel is ensured from a small high pressure tank through an injector with electro-magnetic control.

The high pressure tank (250 to 300 bars) is fed, either by an independent pump, or directly from the spring with compression of liquid, the compressed liquid being then the fuel itself. In that case, a valve-and-nozzle device enables, in a very simple way, to have at disposal the fuel under high pressure as soon as the mobile parts have oscillated during about 20 cycles.

The injector itself comprises a strainer obturated by a needle which rises under action of a magnetic circuit, said circuit being fed by electric current pulses, having an intensity and a duration which are set by the electronic regulating device. With the use of an appropriate technology, the injector can feed the heat cylinder with a well atomized spray of a duration which is adjustable from 0 to 100 microseconds. The injection is stopped rapidly as soon as the intensity of the electric current becomes smaller than a predetermined value, the pressure of the liquid being combined with the action of a spring having a strong resilient reaction to apply the needle on its seating. Thus it is possible to inject fuel in suitable conditions up to the frequency of 200 Hertz.

To obtain a correct operation of the engine, it is desired that the quantity of fuel injected be automatically determined in accordance with a function of picking-up of the electric energy. The method which is usually utilized consists of maintaining invariable the speed of the mobile parts at the moment then they obturate the outlet apertures. If, for example during the cycle which has just been completed, the quantity of effective energy, which has been picked-up, has increased, the speed is reduced with respect to the standard speed of the mobile parts. The time duration of the electric pulse controlling the injection then will be increased and the energy delivered by the next combustion will be also increased. Thus. cycle after cycle will be corrected with the consequences of the variations of load, the kinetic energy of the mobile parts upon the compression step being maintained invariable. This enables having a substantially invariable volumetric ratio.

Such a regulation ensures a slight increase of the machine frequency when the load increases and maintains a minimal speed when the load is cancelled. This type of regulation corresponds to a proper utilization on vehicles but, of course other adjustments could be obtained to provide, for example, a frequency strictly invariable and independent of the load.

The rectilinear heat engine is a machine with a rectilinear motion, which transforms, into mechanical or electrical energy, the heat energy resulting from the combustion of a hydrocarbon, and which is characterized by the fact that the mobile equipment units have, on their whole length, a constant circular section (see FIG. 1a).

Each cylinder comprises two units of mobile equipment which oscillate symmetrically between the combustion chamber and two hydraulic devices ensuring the return of the units of equipment to the interior neutral point (or inner dead center).

Upon their motion, the cylinder mobile units of equipment cause the reluctance of two magnetic circuits to change; the magnetic circuits, on the other one hand, maintain the synchronism of the symmetrical motions and allow the start of the machine.

The useful energy furnished by the rectilinear engine can be taken either by hydraulic devices, or by magnetic circuits having a variable reluctance. In the first case, the machine yields liquid under high pressure; in the second case, the energy is changed into electric current.

The rectilinear engine JARRET has been designed to obtain simultaneously a high output and a low pollution prejudice, in a range of power from a few kilowatts to a few tenths of kilowatts per cylinder. Characteristics sought include the following:

OUTPUT

The global output of the energy transformation is equal to the product of the heat, mechanical and electro-magnetic outputs of the machine.

Heat Output

If the combustion is complete, said output depends, on one hand, on the expansion ratio of the burnt gases and, on the other hand, on the heat exchanges between hot gases and walls of the combustion chamber.

The expansion ratio is very high (in the range of 20 to 25), because the combustion, especially quick, takes place almost in totality near the interior neutral point (the absence of any connective rod allows the engine to encounter important pressures and pressure changes).

Figure 2A:
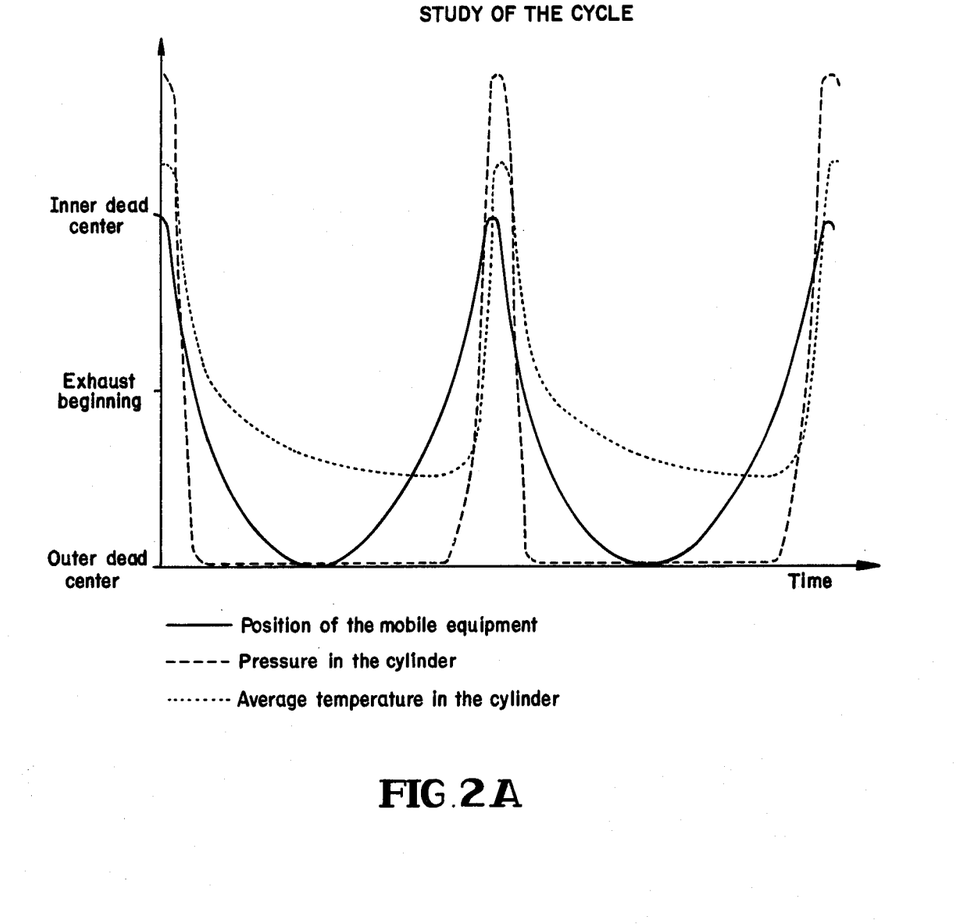
FIG. 2A shows a set of curves of the operating characteristics of the machine, the curves being labeled with the several characteristics.

The heat exchanges with the walls are low, both because of the adoption of two opposite pistons with hot side, and also of the reduction of the time of high pressures and high temperatures (see FIG. 2a).

It can be deemed that the heat output would be in the range of 0.55 and 0.60 according to the magnitudes and frequencies adopted.

Mechanical Output

The suppression of the energy transmission by mechanical system ("rod-crank") reduces the solid and viscous friction in considerable proportions. These frictions, then resulting essentially from the pressure of the segments on the cylindrical walls, can reach a value corresponding from 5 to 8% of the transmitted energy.

The device for the return of the mobile units of equipment consists of two hydraulic springs utilizing the hydrostatic compression of a liquid which can be eventially the combustible means of the engine. The output of such springs is in a range of about 0.98 to 0.99.

The mechanical output, whose variations in function of the frequency are low, should then be higher than 0.9 and, in the best conditions, could approach 0.95.

Electro-magnetic output

For a given frequency, the electro-magnetic output is a function, on one hand, of the magnitude of the magnetic circuits and especially of the windings, on the other hand, of the quality of the materials which are utilized.

With "iron" losses being lower than the "copper" losses, it is advantageous to increase the operating frequency, which is principally limited by the inertia of the mobile units of equipment. It seems that the best frequency values are between 100 and 200 cycles per second (the electro-magnetic output then reaching 0.85 or 0.95 if the most important portion of the useful energy is transmitted in the form of electric current).

In the case where the taking of energy is by the hydraulic devices, the losses in the magnetic circuits do not represent more than 1 or 2% of the transmitted energy, but there has to be taken into consideration the losses of pressures inherent with hydraulic systems.

Global output

By using a technology suitably adapted and to the extent where the conditions of combustion previously mentioned are respected the rectilinear engine would show a global output ranging between 0.42 and 0.54 depending on the arrangements and sizes of the components of the machine.

Consequently said output would be considerably higher than that of the generator sets or motor pump sets already existing and, in general, than that of heat engines with pistons.

PREJUDICE (POLLUTION)

The head machines are able to cause some prejudice to the environment both by the magnitude of the noises they produce and also by the poisoning of the gases they send into the atmosphere.

Importance of the noises

The noises produced by the machine result, on one hand, from the exhausting of gases, on the other hand, from the vibrations of the mechanical parts. The structure and the operating conditions of the rectilinear engine of the present invention are very favorable to a restriction of the prejudicial noises.

(a) Exhaust noises: The operating frequency being constant, it is relatively easy to reduce the exhaust noises by regularizing the flow of the gases, chiefly if, as it is provided, the machine is utilized with a substantially constant load.

(b) Vibrations: The machine is accurately balanced with the mobile units of equipment of similar mass moving symmetrically according to a rectilinear trajectory.

The absence of valve means and rod means avoids the creation of the transmission of vibrations: simultaneously the restraints resulting from the hydraulic springs are relatively low and very progressive.

The cylindrical mobile units of equipment are rigid and cannot be resonant at sound frequencies.

Thus it seems that the rectilinear engine of the present invention could be substantially noiseless, even at a high pressure.

Noxiousness of the gases

To reduce the noxiousness of the gas emitted into the atmosphere, the rectilinear engine of the present invention ofters a realization of a complete combustion with important excess of air. Thus it seems possible to avoid the presence of unburnt gases in the exhaust gases while preventing the formation of carbon monoxide and nitrogen oxides.

To obtain such a result, the injection slightly proportioned, is made before the interior neutral point; the combustion starts and rapidly extends under the high pressures resulting from the important volumetric ratio, but the increase of temperature remains relatively limited; after passing over the interior neutral point, the pressure and the temperature decrease progressively to return to very low values at the start of the exhaust step.

The variations in pressure are pretty strong, but can be supported by the solid mobile units of equipment. The ratio in weight (air/fuel) would be between 50 and 60 which leads to a combustion performed in the presence of a quantity of air in excess.

These combustion conditions are of course not usual; they would be admittable in an engine with rods where simultaneously there are imposed a restriction of the pressures and an important period of the high temperatures.

Besides, it can be noted that, for a rectilinear engine of the present invention, the increase of the cubic capacity, resulting from the utilization of an important quantity of air in excess, does not considerably increase the volume of the machine, because of the absence of connecting rods and of the corresponding housing.

Besides, it is not, of course, necessary to use a combustible means with anti-explosive additive, containing some lead, since a priori there is admitted the great rapidity of the combustion.

The comply with the physical conditions allowing features to unite in obtaining a high output and a low polution or prejudice, it has been necessary to make novel and original technical arrangements concerning respectively the heat, hydraulic and electric portions of the machine.

Heat Portion

The filling of the cylinder, the compression, the combustion and the expansion are performed at each going in and fro of the opposite pistons according to a cycle whose duration is of 6 to 10 milliseconds.

The combustion and the expansion are performed in only one tenth of the cycle, while the exhaust and the filling of the cylinder take 6 to 7 tenths of the cycle. To obtain this result, it is necessary, on one hand, that the exhaust apertures begin to be uncovered at halfway location of the mobile units of equipment; on the other hand, there is necessary that the characteristics of the backing springs be suitably adapted.

These springs show maximal reactions relatively low at the exterior neutral points and contribute to give speed to the mobile units of equipment during the expansion step. As shown in FIG. 2a, the time of the high pressures is thus reduced to a few hundreds of microseconds.

The fuel being entirely injected before the interior neutral point, the combustion is performed under the action of the increase in temperature due to the rapid increase of pressure. The stroke of the mobile units of equipment can slightly vary in function of the speed of combustion, the volume of the combustion chamber being determined not by the geometrical arrangements of a connecting-rod, but by the conditions of transfer to the compressed gases of the kinetic energy of the equipment (which limits the heat and mechanical restraints).

Hydraulic Portion

The return of the mobile units of equipment to the interior neutral point is ensured by springs with hydrostatic compression. The compressed liquid is in general the fuel designed for the feeding of the machine; in the present case this is some gas-oil which, under the action of a maximal pressure of 400 to 500 bars, has its volume decreased by 2 or 3%.

The spring comprises two independent chambers:
on one hand, a high pressure chamber in which the pressure of the liquid changes from a substantially zero value when the units of equipment are close to the interior neutral point, to a maximal value when the units of equipment are at the exterior neutral point;

on the other hand, a depression chamber which receives the leaks of the high pressure chamber and which permits application of a substantially constant and outwardly directed force upon the mobile units of equipment.

The feeding of the high pressure chamber is ensured by a valve from a little pre-chamber suitably arranged therewith; the injection of the fuel in the heat cylinder is made directly from the high pressure chamber in view of elimination of a pump.

When the taking of an important portion of the useful energy is undertaken by the hydraulic device, the high pressure chamber acts as a body of a pump and the pressure remains there substantially constant, at its highest value for about half the cycle.

Electrical Portion

This portion of the machine is constituted of two symmetrical rectilinear alternators. Each alternator comprises a fixedly mounted inductor means with eight contact-studs provided with suitble windings.

Inside the inductor, there occurs movement of the mobile units of equipment having a central portion made of magnetic metal sheets constituted in the form of a laminated ring, whereby the reluctance of the magnetic circuits can be caused to vary.

The variations of the magnetic flux, resulting from the changes of reluctance, induce electromotive forces into the windings which furnish the energy in the form of alternating current taken from the mobile units of equipment.

The two alternators are coupled and thus ensure the synchronism of the symmetrical motions of the mobile units of equipment.

These two alternators are also utilized as starting engines to cause the mobile uiits of equipment to oscillate under the action of electrical pulses furnished by an electronic device established for that purpose.

FIELD OF UTILIZATION

The various technical arrangements previously described can be utilized for the manufacture of rectilinear engines relatively light in weight and having a very small volume. Realization of advantages of the present invention can occur without requiring the creation of new materials or use of expensive fuels.

The mechanical simplicity of the rectilinear engines permits attaining of both a simplicty and a feasibility which are very surpring while limiting manufacturing costs involved therewith. The maintainance of these engines would be also economical because of the small number of mobile parts and the exceptional easiness of dismantling.

The rectilinear engines could be utilized with a single cylinder or with a group of cylinders, in a range of power extending from a few kilowatts to a few hundred kilowatts; each time the energy can be furnished in the form of electric current or in the form of a liquid under high pressure.

The utilization of these rectilinear engines seems especially suitable and recommended for terrestrial or marine vehicles, especially when the propulsion is ensured by electrical or hydraulical engine. The high output and the low prejudice (pollution) of the rectilinear engines would furthermore justify the use of electrical or hydraulic transmissions which are most of the time more durable and more flexible than the positive mechanical transmissions.

Applications can relate to machines comprising a distribution of the useful energy in multiple points, as it is the case for some agricultural equipment or civil engineering (construction) equipment. In these fields, such rectilinear engines, utilized in mobile generator set or at stable point, would be very helpful.

As a conclusion, there is noted that the rectilinear engines of the present invention involve a simple and compact machine:

on one hand, the technique of the heat engines with cylindrical pistons, with segments but without any connecting-rod, which gives the advantage of the important ratio of expansion of the burnt gases which are necessary for a high output;

on the other hand, the technique of the rectilinear alternators with variable reluctance with pumps and hydraulic springs, which leads to ensure the passage into the cylinder of an important quantity of air by comparison with the transmitted power, and to realize an engine "cold" with very little polluting.

Study of the motion of the mobile units of equipment (for rectilinear engine of 22,000 Watts)

I—HYPOTHESIS

Frequency: 125 cycles per second.
Stroke of each mobile equipment: 0.054 m.
Interior diameter of the cylinder: 0.096 m.
Average speed of the mobile equipment: 13.5 m/sec.
Surface of each heat piston: 0.007 235 $m^2$. (sq.m.).
Distance between the exhaust apertures: 0.064 m.
Efficient cubic capacity (volume of the heat cylinder at the closing of the exhaust apertures): 0.000463 $m^3$. (cub.m).
Compression ratio: 26.7.
Distance between pistons at interior neutral point: 0.0024 m.
Useful energy furnished by the machine at each cycle: 176 joules.
Energy brought to the mobile equipment by the gas pressure: 208 joules.
Energy stored in the hydraulic springs: 484 joules.
Fuel (gas-oil) injected upon each cycle: 0.008 575 gram.
Weight of the gases contained in the cylinder upon closing of the exhaust apertures: 0.45 gram.
Average temperature of the gases upon closing of the exhaust apertures: 364° K.
Mass of the mobile equipment: 2.45 Kg.
Kinetic energy of the mobile equipment upon closing of the exhaust apertures: 402 joules.

VALUATION OF THE EMISSIONS OF NITROGEN OXIDES FOR THE JARRET'S RECTILINEAR ENGINE OF 22,000 WATTS

The present study resumes the same hypothesis as the previous one relative to the power-generator of 8,000 watts, i.e.:

Richness considered as zero
Kinetic described by the Kaufman's bimolecular mechanism
The computation is made with two fractions of arbitrary residual mass: 0% and 20%.
Simultaneously, the quantities of NO formed, are computed while assuring that is reached the thermodynamic balance at the mentioned temperatures.

The results so obtained set forth are subsequently herewith in appendix form of pages marked "A," "B," "C," "D" and "X" the latter setting forth characteristic values useful for the study of motion of the mobile equipment; these appendix pages provide substantially the same notations and conclusions as previously made.

Yet, with the information of the future California standards relating to the pollution by the Diesel engines, it has been thought interesting to give also the quantities of polluting elements sent in the air in grams per hour and in grams per HP. hour for NO, and also the same quantities sent in the air, while considering the complete transformation of NO into $NO_2$.

The corresponding values of the thermomagnetic generator of 8,000 watts are concurrently reconsidered.

As information, there is noted that the California standard considers the total sum of the unburnt hydrocarbons and of the nitrogen oxides (considered as $NO_2$) and limits the quantity globally sent during a characteristic cycle at 16 grams per HP. hour for 1973 and at 5 grams per HP. hour for 1975. The CO is limited at 40 grams per HP. hour for 1973 and grams per HP. hour for 1975.

There are programs being undertaken in the United States and abroad to try to develop and improve a non-polluting engine for motor vehicles. The foregoing technical notes provide basis for indications as to the work done as well as the objects and solutions thereof for attaining such a non-polluting engine as well as concerning work done on the basis of California regulations concerning non-pollution development work, with a goal to meet California regulations for 1975.

The present invention involves a general embodiment of a rectilinear non-polluting motor. Admittedly, further improvement can be contemplated and there will be coming along advances over prototypes that have been perfected to run in France.

Further detailed features will be set forth separately concerning the starter, electrical and electronic realization of the electric power generator, the injection for heat engines, the injection control, and the like, all to be made for standards or regulations of non-pollution control.

The invention is not restricted to the embodiments shown and described in detail, for various modifications thereof can moreover be applied to it, without departing from the scope of the invention.

What we claim is:

1. The method of operating an internal combustion engine, comprising, reciprocating two pistons in a cylinder toward and from each other, admitting air to said cylinder and injecting between 0.01 and 0.02 milligrams of gas oil into said cylinder between said pistons, compressing the mixture of air and gas oil between said pistons as they approach each other to initiate combustion of said mixture at a temperature higher than 1200° K. for about one millisecond, moving said pistons in opposite directions in said cylinder by said combustion and compressing resilient means by said outwardly moving pistons to provide 0.1–0.2 calories per $cm^3$ of the maximum cylinder volume, and accumulating in said resilient means 0.5 to 2 joules per $cm^3$ of said maximum cylinder volume.

2. The method as claimed in claim 1, in which the outwardly moving pistons act on a liquid as the resilient means.

3. The method as claimed in claim 1, in which each piston energizes an inductor in the cylinder to generate electrical energy.

4. A non-polluting heat machine with internal combustion, comprising in combination at least one cylinder with intake and exhaust apertures, and in which are moving two symmetrical working parts constituting opposite pistons designed to compress under the return impulse of two resilient devices a combustible mixture introduced into the cylinder in order to produce an effective energy under the action of the burnt gas with combustion temperature being kept higher than 1200° K. for small time duration of about 1 millisecond which makes nitrous oxides minimal due to small duration of time of the high temperature and through a reciprocating motion of said working parts, wherein said energy is extracted without the presence of any positive driving elements connected to the pistons, said pistons having a mass ranging between 5 and 30 grams per $cm^3$ of the cylinder volume computed at its maximal value when the working parts obturate the intake and exhaust apertures, the quantity of fuel injected upon every cycle at maximal power providing 0.1–0.2 calories per $cm^3$ of said maximal cylinder volume value and the return resilient devices for the working parts being provided to accumulaate and send back upon every cycle a mechanical energy comprised between 0.5 and 2 joules per $cm^3$ of said maximal cylinder volume value.

5. A non-polluting heat machine in combination according to claim 4, wherein the return resilient devices are constituted by two hydraulic loads housed into the cylinder and adapted to be compressed under the return impulse upon every cycle by the rear sides of said two cymmetrical working parts.

6. A non-polluting heat machine in combination according to claim 4, wherein an inductor is placed on the cylinder and there is a lamellar metal mass as machine operating components supported by each piston so that the effective energy is an available electrical power which is produced by the reciprocating motion of said lamellar mass supported by each piston in front of said inductor placed on the cylinder.

* * * * *